(12) United States Patent
Müller et al.

(45) Date of Patent: Dec. 30, 2014
(10) Patent No.: US 8,919,260 B2

(54) RUNNING GEAR FOR A RAIL VEHICLE

(75) Inventors: Detlef Müller, Siegen (DE); Matthias Kwitniewski, Aachen (DE); Igor Geiger, Kreuztal (DE); Paul Gier, Aachen (DE); Heiko Mannsbarth, Wiesbaden (DE)

(73) Assignee: Bombardier Transportation GmbH, Berlin (DE)

( * ) Notice: Subject to any disclaimer, the term of this patent is extended or adjusted under 35 U.S.C. 154(b) by 274 days.

(21) Appl. No.: 13/412,101

(22) Filed: Mar. 5, 2012

(65) Prior Publication Data

US 2012/0255459 A1    Oct. 11, 2012

(30) Foreign Application Priority Data

Mar. 16, 2011 (EP) .................................... 11158519

(51) Int. Cl.
| | | |
|---|---|---|
| *B61C 5/02* | (2006.01) | |
| *B61C 9/50* | (2006.01) | |
| *B60T 5/00* | (2006.01) | |
| *B61D 17/02* | (2006.01) | |

(52) U.S. Cl.
CPC ............ *B61D 17/02* (2013.01); *Y02T 30/32* (2013.01); *B61C 9/50* (2013.01); *B60T 5/00* (2013.01)
USPC .......................................................... 105/59

(58) Field of Classification Search
CPC .......... B61C 5/00; B61C 5/02; B62D 35/005; B62D 35/02
USPC ............... 105/49, 59, 86, 96, 96.1, 133, 136; 296/180.1, 180.2, 180.4
See application file for complete search history.

(56) References Cited

U.S. PATENT DOCUMENTS

| | | | | |
|---|---|---|---|---|
| 2,759,431 | A | * | 8/1956 | Britton et al. .................... 105/59 |
| 4,805,747 | A | * | 2/1989 | Moedinger et al. ........ 188/264 A |
| 4,810,021 | A | * | 3/1989 | Burst .......................... 296/180.1 |
| 5,511,847 | A | * | 4/1996 | Weisbarth et al. ......... 296/180.1 |

FOREIGN PATENT DOCUMENTS

| | | |
|---|---|---|
| DE | 102004041090 A1 | 3/2006 |
| DE | 102007022298 A1 | 11/2008 |
| DE | 102007051496 A1 | 4/2009 |
| EP | 1781523 B1 | 9/2007 |

* cited by examiner

*Primary Examiner* — R. J. McCarry, Jr.
(74) *Attorney, Agent, or Firm* — The Webb Law Firm

(57) ABSTRACT

A running gear for a rail vehicle includes a wheel unit and a cooperating unit. The running gear defines a longitudinal direction, a transverse direction and a height direction, while the wheel unit defines a wheel unit axis. The cooperating unit is connected to the wheel unit and cooperates with the wheel unit during operation the running gear to drive and/or brake the wheel unit. Furthermore, during operation of the running gear, an airflow passes the wheel unit and the cooperating unit, in the height direction, at a first height level below the wheel unit axis. At least one air guide device is provided, the air guide device being arranged and adapted to guide an airflow portion of the airflow towards a section of the cooperating unit located at a second height level, the second height level being located above the first height level above the wheel unit axis.

13 Claims, 2 Drawing Sheets

RUNNING GEAR FOR A RAIL VEHICLE

BACKGROUND OF THE INVENTION

The present invention relates to a running gear for a rail vehicle, comprising a wheel unit and a cooperating unit, the running gear defining a longitudinal direction, a transverse direction and a height direction, while the wheel unit defines a wheel unit axis. The cooperating unit is connected to the wheel unit and cooperates with the wheel unit during operation of the running gear to drive and/or brake the wheel unit. Furthermore, during operation of the running gear, an airflow passes the wheel unit and the cooperating unit, in said height direction, at a first height level below the wheel unit axis. The present invention further relates to a rail vehicle comprising such a running gear.

In modern rail vehicles, in particular, modern high-speed rail vehicles, there is a tendency to close the lower surface of the running gear as far as possible, e.g. by corresponding shield elements or the like, in order to achieve several goals. One of these goals is to avoid impacts of pieces of ballast or other objects lying on the track currently negotiated, thereby avoiding damage of sensitive components of the running gear. Such a shielding concept is disclosed, for example, in EP 1 781 523 B1. A further goal of such extensive shielding of the lower surface of the running gear is to achieve a less disturbed flow leading to a reduction of the overall drag of the running gear, and, ultimately, a reduction of the overall drag of the vehicle.

A disadvantage, however, of this extensive shielding concept is that components of the running gear experiencing heating during operation (such as motors, gears, brakes etc) are not cooled any more by the airflow at the underside of the running gear. Hence, other cooling mechanisms have to be implemented for these components, which ultimately add to the overall cost of the running gear.

SUMMARY OF THE INVENTION

It is thus an object of the present invention to provide a running gear as outlined above that, at least to some extent, overcomes the above disadvantages. It is a further object of the present invention to provide a running gear that provides simple cooling of components of the running gear while at the same time substantially maintaining low overall drag of the running gear.

The above objects are achieved starting from a running gear according to the preamble of claim 1 by the features of the characterizing part of claim 1.

The present invention is based on the technical teaching that simple cooling of components of the running gear while at the same time substantially maintaining overall low drag of the running gear may be achieved by implementing a comparatively narrow (in the transverse direction) air guide device associated to the respective component of the running gear to be cooled. This air guide device guides a fraction of the airflow towards the component(s) to be cooled, in particular, towards the upper parts of the respective component located above the wheel unit axis, such that proper cooling of the respective component is achieved. Moreover, due to the comparatively narrow design of this air guide device, a comparatively low disturbance is introduced into the airflow passing underneath the running gear such that, if at all, only a moderate rise in the overall drag is induced by this air guide device. This disturbance may be further reduced in certain variants of the running gear according to the invention where proper well-defined flow separation of the airflow from the lower side of the air guide device is provided for, e.g. by providing an appropriate flow separation edge or the like at this lower side.

Hence, according to one aspect, the present invention relates to a running gear for a rail vehicle, comprising a wheel unit and a cooperating unit. The running gear defines a longitudinal direction, a transverse direction and a height direction, while the wheel unit defines a wheel unit axis. The cooperating unit is connected to the wheel unit and cooperates with the wheel unit during operation the running gear to drive and/or brake the wheel unit. Furthermore, during operation of the running gear, an airflow passes the wheel unit and the cooperating unit, in the height direction, at a first height level below the wheel unit axis. In addition, at least one air guide device is provided, the air guide device being arranged and adapted to guide an airflow portion of the airflow towards a section of the cooperating unit, this section being located, in the height direction, at a second height level.

The second height level, in the height direction, is located above the first height level, in particular, above the wheel unit axis.

The width of the air guide device may be chosen according to the needs of the respective application. In particular, the width of the air guide device may be chosen as a function of the cooling power and the acceptable influence on the overall drag of the running gear to be achieved. Preferably, the air guide device comprises an air guide element arranged and adapted to guide the airflow portion. The air guide element has a guide element width in the transverse direction, while the wheel unit defines a track width in the transverse direction. In these cases, the guide element width preferably selected to be 1% to 30% of the track width, preferably 2% to 20% of the track width, more preferably 5% to 10% of the track width. With such a configuration, appropriate cooling of the respective component of the running gear may be achieved while keeping the impact on the overall drag of the running gear acceptably low.

Guiding of the desired portion of the airflow may, in principle, be achieved by any suitable means. Preferably, the air guide device comprises an air guide element arranged and adapted to guide the airflow portion, the air guide element, in particular, being formed by a plate shaped element. Such configurations are particularly easy to implement. They may even be simply included in existing designs.

Mounting of the air guide element may also be achieved by any suitable means. For example, at least a part of the air guide element may be formed monolithic with the cooperating unit. In addition or as an alternative, at least a part of the air guide element may be formed by a separate component mounted to the cooperating unit.

The air guide element, in particular, the plate shaped element may be made of any suitable material or material combination. With particularly simple and robust designs, the plate shaped element is formed by a piece of sheet metal. The plate shaped element may have any suitable geometry which is adapted to the desired flow pattern within the airflow portion to achieve the desired cooling effect. Preferably, the plate shaped element, in a sectional plane defined by the height direction and the longitudinal direction, has a cross-section that is at least section wise polygonal and/or at least section wise curved.

With preferred embodiments of the invention, the airflow defines a main flow direction while the air guide device has an air guide surface. The air guide surface, at least section wise, is inclined with respect to the main flow direction, reaches into the airflow and guides the airflow portion. Hereby, a proper fraction of the airflow may be separated as the airflow portion and may be properly guided towards the component(s) to be cooled.

In principle, the guide surface may be a simple, planar surface. Preferably, however, an at least partially angled and/or curved geometry is chosen to achieve further benefits, in particular, regarding the minimization of the drag.

With preferred embodiments of the running gear according to the invention the air guide device has a free end reaching into the airflow, wherein the air guide surface has a first air guide surface section and a second air guide surface section. The first air guide surface section is located at the free end and is inclined with respect to the main flow direction by less than 20°, preferably by less than 10°, more preferably by less than 5°. With such a configuration a smooth separation of the airflow portion from the rest of the airflow may be achieved. In addition or as an alternative, the second air guide surface section is located adjacent to the first air guide surface section and is inclined with respect to the main flow direction by more than 15°, preferably by more than 20°, more preferably by more than 25°, even more preferably by 20° to 30°. This has the advantage that proper yet sufficiently smooth deflection of the airflow portion is achieved, which allows reaching parts located at the upper side of the cooperating unit while still keeping the flow disturbance and, hence, the adverse impact on the overall drag comparatively low.

This potentially adverse impact of the air guide device on the overall drag of the running gear is further reduced with preferred embodiments, wherein the air guide device has a free end reaching into the airflow and a lower air guide device surface facing towards a track to be negotiated. The lower air guide device surface forms a flow separation section, in particular, a flow separation edge, for the airflow. Such a design provides proper flow separation and, hence, a reduction or a minimization of the disturbance introduced into the airflow downstream of the air guide device.

The air guide element may be connected in any suitable location to running gear. Preferably, the air guide element is connected to the cooperating unit itself at a connection location. Preferably, the connection location is located at a height level below the wheel unit axis.

The air guide device may be used in combination with any component of the running gear that requires cooling. Hence, with preferred embodiments of the invention, the cooperating unit comprises a drive unit driving the wheel unit. Preferably, the drive unit comprises a motor unit and a gear unit, and the air guide device guides the airflow portion towards a gap formed between the motor unit and the gear unit, in particular, towards a drive shaft connecting the motor unit and the gear unit. By this means a simple and effective, more or less focused cooling of this portion of the drive unit may be achieved.

With further preferred embodiments of the invention, the cooperating unit comprises a brake unit braking the wheel unit. Here, it is possible, for example, that the air guide device is adapted to guide the airflow portion towards a caliper device of the brake unit in order to provide proper cooling of the same.

The air guide device may generally be used with any type of running gear. For example, it may be used with running gear is having only one single wheel unit (a wheel unit in the sense of the present invention being, for example, a wheel set or a wheel pair). Preferably, the air guide device is used in combination with a running gear having a plurality of wheel units, such as e.g. a bogie. Hence, with preferred embodiments of the present invention, a further wheel unit is provided, the air guide device, in the longitudinal direction, being arranged between the wheel units. Such a configuration has the advantage that, for example, components at the trailing wheel unit of the running gear (which are typically shielded from the airflow by the leading components of the running gear) may be cooled appropriately via the associated air guide device.

The beneficial effects of the present invention are particularly noticeable in high-speed applications where the lower side of the running gear, in particular, the part of the running gear frame located between the wheel units, is shielded. Hence, with preferred embodiments of the running gear according to the invention, a running gear frame is supported on the wheel units, the running gear frame having a middle section located between the wheel units. The airflow, during operation of the running gear, flows along a lower surface of the middle section, the lower surface defining the first height level of the airflow, and the lower surface, in particular, being a substantially closed surface.

Here, the lower surface of the middle section may define a flow separation edge for the airflow, and the air guide device is located adjacent to and associated to the flow separation edge such that a beneficial flow behavior is achieved.

As mentioned above, implementation of the present invention is particularly beneficial in high-speed rail vehicles. Hence, preferably, the running gear according to the present invention is preferably adapted to be used for high-speed operation at normal operating speeds above 250 km/h, preferably above 300 km/h, more preferably above 350 km/h.

The present invention furthermore relates to a rail vehicle with a running gear according to the invention as it has been outlined above.

Further embodiments of the present invention will become apparent from the dependent claims and the following description of preferred embodiments which refers to the appended figures.

DETAILED DESCRIPTION OF THE INVENTION

Figure 1:
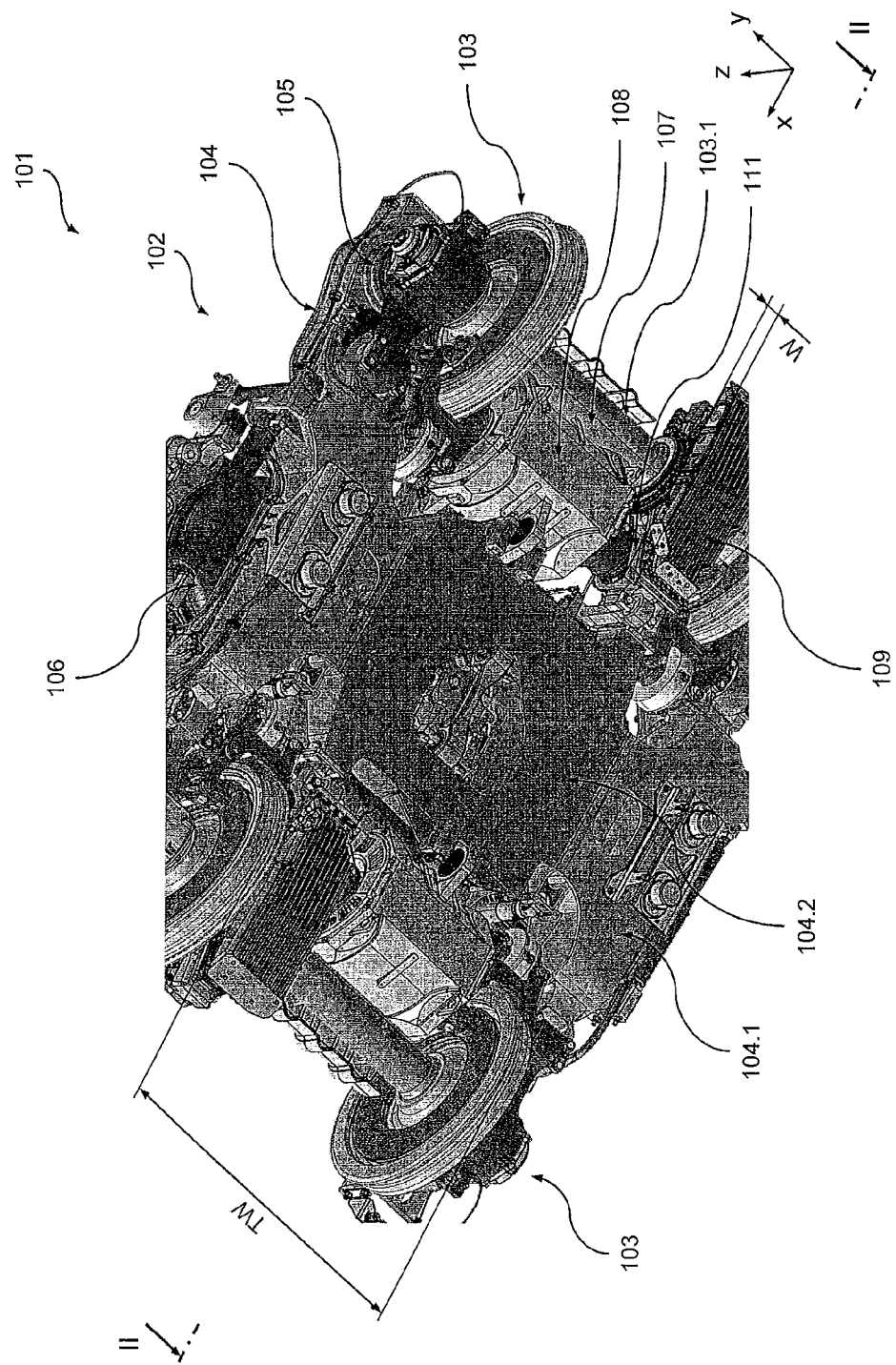
FIG. 1 is a schematic perspective bottom view (i.e. seen from track level); of a preferred embodiment of a running gear according to the present invention used in a preferred embodiment of the vehicle according to the present invention.
Figure 2:
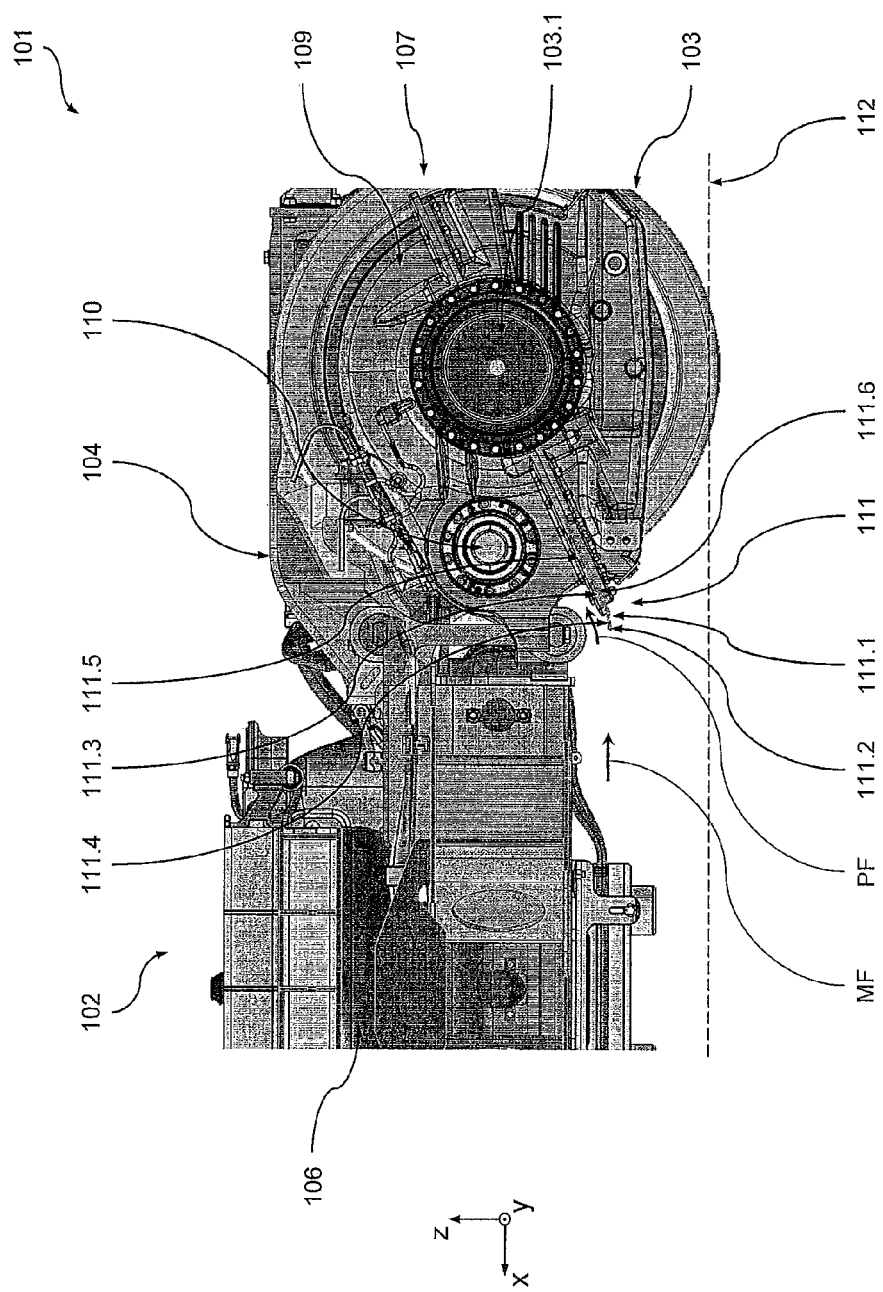
FIG. 2 is a schematic sectional representation of a detail of the running gear of FIG. 1 (along line II-II of FIG. 1).

With reference to FIGS. 1 and 2 a preferred embodiment of a rail vehicle 101 according to the present invention comprising a preferred embodiment of a running gear 102 according to the invention will now be described in greater detail. In order to simplify the explanations given below, an xyz-coordinate system has been introduced into the Figures, wherein (on a straight, level track) the x-axis designates the longitudinal direction of the running gear 102, the y-axis designates the transverse direction of the running gear 102 and the z-axis designates the height direction of the running gear 102.

The vehicle 101 is a high-speed rail vehicle with a nominal operating speed above 250 km/h, more precisely above 300 km/h to 380 km/h. The vehicle 101 comprises a wagon body (not shown) supported by a suspension system on the running gear 102. The running gear 102 comprises two wheel units in the form of wheel sets 103 supporting a running gear frame 104 via a primary spring unit 105. The running gear frame 103 supports the wagon body via a secondary spring unit 106.

Each wheel set 103 and is driven by a drive unit 107 (forming a cooperating unit in the sense of the present invention). The drive unit 107 comprises a motor 108 (suspended to the running gear frame 104) and a gearing 109 (sitting on the shaft of the wheel set 103) connected via a motor shaft 110.

The running gear frame 104 is of generally H-shaped design with a middle section 104.1 located between the wheel sets 103. As can be seen from FIG. 1, this middle section 104.1 has a substantially planar lower surface 104.2 which is substantially closed, i.e. has only very few openings, and forms pronounced flow separation edges at its leading and trailing end (in the longitudinal direction). Consequently, the lower surface 104.2 of the middle section 104.1 mainly defines the airflow passing below the running gear during the operation of the vehicle 101 and being represented in FIG. 2 by its main flow direction MF.

This design, generally, leads to a beneficial flow behavior underneath the running gear 104. The streamlines of the flow predominantly smoothly pass underneath the middle section 104.1, the drive unit 107 and the wheel set shaft 103.1 at a first height level (in the height direction) without excess disturbances being introduced into the flow due to the streamlines hitting obstacles. Hence, flow behavior with comparatively low turbulence and, consequently, comparatively low drag results.

However, this design in principle would lead to a drawback that components, such as the motor 108 and the gearing 109, experiencing heating during operation of the vehicle 101 are only cooled on their lower side by the passing airflow. As a consequence, to avoid excessively uneven temperature distributions within these components, cooling of other parts of these components, in particular, cooling of parts located at the upper side of these components is provided with the solution as outlined below.

As can be seen from FIGS. 1 and 2, a comparatively narrow (in the transverse direction) air guide device 111 comprising a separate plate shaped air guide element 111.1 made of sheet metal is connected to the gearing 109. The air guide element 111.1 is connected to the gearing 109 at a connecting location which is situated on the one hand, in the longitudinal direction, between the wheel sets 103 and, on the other hand, in the height direction, below the wheel set shaft 103.1. It will be appreciated, however, that, with other embodiments of the invention, the air guide element may also be totally or in part formed monolithic with the gearing.

This air guide element 111.1 has a free end 111.2 that reaches into the airflow MF and guides an airflow portion PF of the airflow MF (i.e. a fraction of the airflow MF) upwards towards the gap formed between the motor 108 and the gearing 109 and bridged by the motor shaft 110.

This solution has the advantage that, in a very simple manner, parts of the motor 108, in particular the motor shaft 110, and parts of the gearing 109 located at a second height level (in the height direction) located above the first height level of the main airflow MF. This airflow portion, in a beneficial manner, even reaches and cools parts of the drive unit 107 located above the wheel set shaft 103.1 of the trailing wheel set 103 (which would otherwise be shielded from the airflow MF by the leading components of the running gear). Hence, appropriate, focused cooling of the trailing drive unit 107 is achieved by very simple air guide means.

The guide element width W of the air guide element 111.1 (in the transverse direction) may be chosen according to the needs of the respective application. As mentioned above, the guide element width W of the air guide element 111.1 is chosen as a function of the cooling power and the acceptable influence on the overall drag of the running gear 102 to be achieved.

In the present example, the guide element width W is about 5% of the track width TW of the wheel set 103. With such a configuration, appropriate cooling of the components of the drive unit 107 is achieved while keeping the impact on the overall drag of the running gear acceptably low. This is the one hand due to the fact that the narrow air guide element 111.1, already due to its comparatively low guide element width W, introduces comparatively few disturbances into the main airflow MF.

As can be seen in particular from FIG. 2, the air guide element 111.1, in a sectional plane defined by the height direction and the longitudinal direction (i.e. in the sectional plane of FIG. 2) has a cross-section that is section wise curved. More precisely, the air guide element 111.1 (at its upper side facing towards the running gear frame 104 and facing away from the track 112) forms an air guide surface 111.3. The air guide surface 111.3 as a partially current geometry which is section wise inclined with respect to the main flow direction MF. The air guide surface 111.3 reaches into the airflow. MF to guide the airflow portion PF upwards as it has been described above.

As can be further seen from FIG. 2, the air guide surface 111.3 has a first air guide surface section 111.4 and a second air guide surface section 111.5. The first air guide surface section 111.4 and the second air guide surface section 111.5 are substantially planar surfaces located adjacent to each other and connected via a curved transition.

The first air guide surface section 111.4 is located at the free end 111.2 of the air guide element 111.1 and is inclined with respect to the main flow direction MF by less than 5° (more precisely by roughly 2°). This has the advantage that a smooth separation of the airflow portion PF from the rest of the airflow MF is achieved at this point.

Furthermore, the second air guide surface section 111.5 is inclined with respect to the main flow direction by 25°. This has the advantage that proper yet sufficiently smooth deflection of the airflow portion PF is achieved, which allows reaching the desired parts of the drive unit 107 located at the upper side of the drive unit with 107 while still keeping the flow disturbance and, hence, the adverse impact on the overall drag of the running gear 102 comparatively low.

The potentially adverse impact of the air guide element 111.1 on the overall drag of the running gear 102 is further reduced due to the curvature of the lower air guide device surface 111.6 formed at the lower surface of the air guide element 111.1 (facing the track 112) at the transition between the first and second air guide surface sections 111.4 and 111.5. The radius of curvature of the lower air guide device surface 111.6 at this transition is selected to be sufficiently small such that a flow separation section for the main airflow MF is formed. Such a design provides proper, well-defined flow separation at this location and, hence, a reduction or a minimization of the disturbance introduced into the airflow MF downstream of the air guide element 111.1.

It will be appreciated that, with other embodiments of the invention, a more pronounced inflow separation section, such as e.g. a pronounced flow separation edge, may be formed at the transition between the air guide surface sections. To this end, for example, an angled design of the air guide element may be selected instead of the partially curved design as shown. Furthermore, arbitrary combinations of such designs may be chosen.

It will be further appreciated that the smoothly inclined design of the air guide element 111.1 as described above has the further advantage that the lower air guide surface 111.6, when travelling in the opposite direction, avoids harsh impact of the airflow at the lower air guide surface 111.6 such that the airflow smoothly joins the lower air guide surface 111.6 preventing the introduction of excess disturbances into the airflow which might otherwise increase the overall drag of the running gear 102.

It will be appreciated that a substantially point symmetrical arrangement is selected for the other wheel set 103. Furthermore, the air guide device may be used in combination with any other component of the running gear that requires cooling. For example, if need be, a brake unit braking the wheel set may be provided with such an air guide device. Here, it is possible, for example, that the air guide device is adapted to guide the airflow portion towards a caliper device of the brake unit in order to provide proper cooling of the same.

Although the present invention in the foregoing has only a described in the context of high-speed rail vehicles, it will be appreciated that it may also be applied to any other type of rail vehicle in order to overcome similar problems with respect to a simple solution for cooling problems.

The invention claimed is:

1. A running gear for a rail vehicle, comprising
a first rail wheel unit and a second rail wheel unit;
a running gear frame supported on said first and second rail wheel units; and
a cooperating unit;
said running gear defining a longitudinal direction, a transverse direction and a height direction;
each of said first and second rail wheel units defining a rolling axis;
said running gear frame having a middle section located between said first and second rail wheel units;
said cooperating unit being connected to said first and second rail wheel units and cooperating with said first and second rail wheel units during operation said running gear to drive and/or brake said first and second rail wheel units;
during operation of said running gear, an airflow passing said first and second rail wheel units and said cooperating unit and flowing along a lower surface of said middle section, in said height direction, at a first height level below said rolling axis, said lower surface defining said first height level;
said lower surface defines a flow separation edge for said airflow,
wherein
in said longitudinal direction, at least one air guide device is arranged between said first and second rail wheel units;
said air guide device being located adjacent to and associated with said flow separation edge;
said air guide device being arranged and adapted to guide an airflow portion of said airflow towards a section of said cooperating unit located, in said height direction, at a second height level; and
said second height level, in said height direction, being located above said first height level or above said rolling axis.

2. The running gear according to claim 1, wherein
said air guide device comprises an air guide element arranged and adapted to guide said airflow portion;
said wheel unit defining a track width in said transverse direction;
said air guide element having a guide element width in said transverse direction;
said guide element width being 1% to 30% of said track width.

3. The running gear according to claim 1, wherein
said air guide device comprises an air guide element arranged and adapted to guide said airflow portion;
said air guide element being formed as a plate shaped element.

4. The running gear according to claim 3, wherein
at least a part of said air guide element is formed monolithic with said cooperating unit and/or
at least a part of said air guide element is formed by a separate component mounted to said cooperating unit.

5. The running gear according to claim 3, wherein
said plate shaped element is formed by a piece of sheet metal and/or
said plate shaped element, in a sectional plane defined by said height direction and said longitudinal direction, having a cross-section that is at least section wise polygonal and/or at least section wise curved.

6. The running gear according to claim 1, wherein
said airflow defines a main flow direction and
said air guide device has an air guide surface;
said air guide surface, at least in the transverse direction, being inclined with respect to said main flow direction, reaching into said airflow and guiding said airflow portion.

7. The running gear according to claim 6, wherein
said air guide device has a free end reaching into said airflow;
said air guide surface having a first air guide surface section and a second air guide surface section;
said first air guide surface section being located at said free end and being inclined with respect to said main flow direction by less than 20°; and/or
said the second air guide surface section being located adjacent to said first sir guide surface section and being inclined with respect to said main flow direction by more than 15°.

8. The running gear according to claim 1, wherein
said air guide device has a free end reaching into said airflow;
said air guide device having a lower air guide device surface facing towards a track to be negotiated;
said lower air guide device surface forming a flow separation section, in particular, a flow separation edge, for said airflow.

9. The running gear according to claim 1, wherein
said cooperating unit comprises a drive unit driving said first and second rail wheel units;
said drive unit comprising a motor unit and a gear unit;
said air guide device guiding said airflow portion towards a gap formed between said motor unit and said gear unit towards a drive shaft connecting said motor unit and said gear unit.

10. The running gear according to claim 1, wherein
said cooperating unit comprises a brake unit braking said first and second rail wheel units;
said air guide device being adapted to guide said airflow portion towards a caliper device of said brake unit.

11. The running gear according to claim 1, wherein
said lower surface is a substantially closed surface.

12. The running gear according to claim 1, wherein the running gear is adapted to be used for high-speed operation at nominal operating speeds above 250 km/h.

13. A rail vehicle comprising a running gear according to claim 1.

* * * * *